Jan. 31, 1967     D. T. McGREGOR     3,301,354

AUTOMATIC SLACK ADJUSTER FOR BRAKES

Filed May 21, 1965

INVENTOR.
DONALD T. McGREGOR
BY Lyon & Lyon
ATTORNEYS

United States Patent Office 3,301,354
Patented Jan. 31, 1967

3,301,354
AUTOMATIC SLACK ADJUSTER FOR BRAKES
Donald T. McGregor, La Crescenta, Calif., assignor to Carlodge Corporation, Los Angeles, Calif., a corporation of California
Filed May 21, 1965, Ser. No. 457,779
3 Claims. (Cl. 188—196)

This invention relates to an automatic slack adjuster for brakes and included in the objects of this invention are:

First, to provide an automatic slack adjuster for brakes which is particularly easy to install in conventional brake systems with a minimum replacement or interchange of parts, and once installed, may be depended upon to function properly with a minimum of servicing or attention and which does not interfere with operation of the brakes.

Second, to provide an automatic slack adjuster for brakes wherein a special shaft is substituted for the conventional manually operated adjustment shaft, and a special bolt is substituted in the connection between the operating rod and brake operating lever, the remaining elements forming the automatic slack adjuster include a novel means for operative connection between said special shaft and said operating rod to effect incremental adjustment or takeup of the brakes as needed.

Third, to provide an automatic slack adjuster for brakes wherein the brake adjustment mechanism is housed within a socket formed within an end of the special adjustment shaft and is covered with an end seal so located as to minimize the entrance of dirt into the brake adjustment mechanism.

With the above and other objects in view as may appear hereinafter, reference is directed to the accompanying drawings in which.

Figure 1:
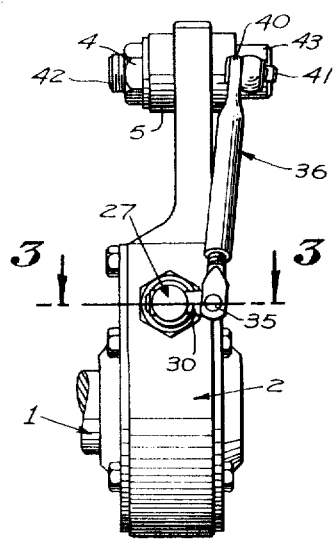
FIGURE 1 is a fragmentary side view of a brake operating mechanism to which has been added the automatic slack adjuster.
Figure 2:
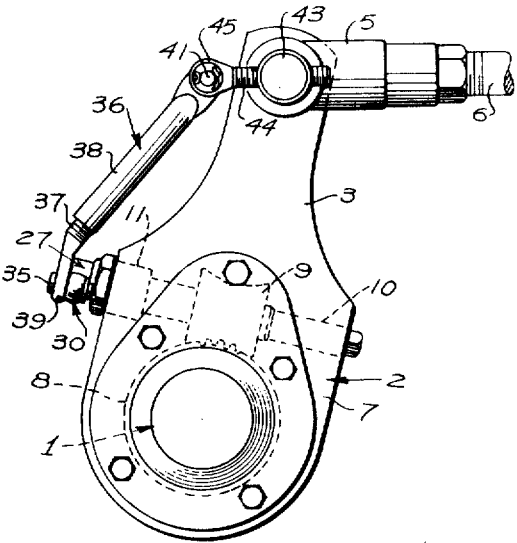
FIGURE 2 is a fragmentary view thereof taken at right angles to FIGURE 1.
Figure 3:
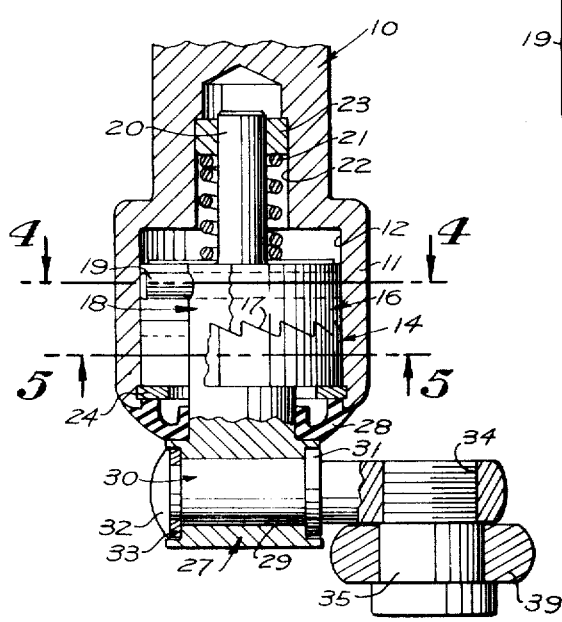
FIGURE 3 is an enlarged fragmentary sectional view of the brake adjuster taken through 3—3 of FIGURE 1.
Figure 4:
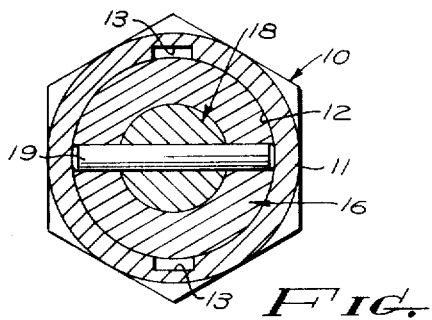
FIGURE 4 is a transverse sectional view taken through 4—4 of FIGURE 3.
Figure 5:
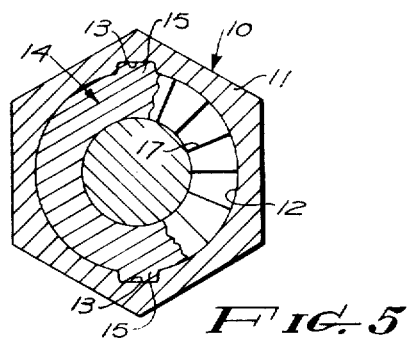
FIGURE 5 is a transverse sectional view taken through 5—5 of FIGURE 3.

The conventional brake operating mechanism comprises a shaft 1 which is connected to a brake, not shown. Mounted on the shaft is a lever structure 2 including an arm 3 which is joined by a pivotal connection 4 to a clevis 5 provided at the end of an operating rod 6.

The lever structure includes a housing 7 which surrounds the shaft 1. Contained in the housing is a worm gear 8 fastened to the shaft and a worm 9 engageable with the worm gear.

The conventional operating mechanism is provided with a shaft which journals the worm 9 and which protrudes from the housing so that it may be manually rotated and cause the worm 9 to rotate the worm gear 8. Rotation of the shaft beyond the limits of movement provided by the operating rod 6 effects adjustment of the brake.

In the exercise of the present invention, a special shaft 10 is substituted for the conventional manually operated shaft. The special shaft is provided with a head 11 having a socket 12 therein, the central walls of which have one or more key slots 13. The outer portion of the socket 12 receives a ratchet collar 14 having key ribs 15 which interlock with the key slots 13.

Slidably and rotatably mounted inwardly from the ratchet collar 14 is a second ratchet collar 16. The two ratchet collars are provided with mutually engaging axially facing ratchet teeth 17. Fitted within the ratchet collars 14 and 16 is an operating stem 18 having a cross pin 19 extending into the ratchet collar 16 so that the ratchet collar 16 is rotated by the stem 18.

The inner end of the stem 18 is reduced as indicated by 20 and guides a spring 21. The spring and reduced end extend into a reduced recess 22 provided at the inner end of the socket 12. The recess receives a bushing 23 for guiding the stem 18 and cooperates with the walls of the socket 12 to assure free reciprocation of the stem.

The assembly comprising the ratchet collars and stem is held within the socket 12 by a split retaining ring 24 fitting in an annular groove. The retaining ring also functions as a thrust washer.

The outer end of the stem 18 is enlarged to form a head 27. Interposed between the head and retaining ring 24 is a seal ring 28 formed of rubber or other elastomer. The head 27 is provided with a cross bore 29 which journals a lever pin 30.

The lever pin is held in place by a flange 31 formed on the lever pin and a rivet head 32 formed at the extremity of the pin after assembly. A washer 33 is interposed between the rivet head and the head 27 of the stem 18.

The lever pin 29 extends radially from the head 27 and is laterally enlarged and provided with a screwthreaded cross opening 34 which receives a screwthreaded journal pin 35.

A link structure 36 is provided which includes a screwthreaded rod 37 fitted within a screwthreaded sleeve 38. One end of the rod 37 is provided with an eyelet 39 which receives the journal pin 35. The extended end of the sleeve 38 is also provided with an eyelet 40 which receives a pin 41.

The otherwise standard pivotal connection 4 includes a special bolt 42 having a head 43 provided with a transverse screwthreaded bore.

The screwthreaded bore receives a screw lever 44 having an eyelet 45 adapted to align with the eyelet 40 and receive the journal pin 41.

Operation of the automatic slack adjuster is as follows:

In the normal functioning of the brake operating mechanism, the operating rod 6 oscillates the lever structure back and forth to apply the brakes. This movement causes the ratchet collar 16 to move relative to the ratchet collar 14 but does not turn the shaft 10. As the brakes wear, the arcuate movement of the lever structure 2 increases until the relative movement of the collars exceeds the circumferential extent of the ratchet teeth. When this occurs, the shaft 10 is rotated a small amount causing the worm to advance the worm gear and effect a compensating adjustment of the brake operating shaft.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, and a worm for advancing the worm gear, of an automatic slack adjuster for turning said worm, comprising:
 (a) a shaft extending through and secured to said worm for turning said worm, said shaft having a cylindrical socket in one end;

(b) a first ratchet member secured to said shaft adjacent the outer end of said socket with its ratchet teeth facing inwardly with respect to said socket;

(c) a second ratchet member slidably and rotatably mounted in said socket and having teeth engageable with the teeth of the first ratchet member;

(d) a stem secured to said second ratchet member in coaxial relation to said shaft and extending through said first ratchet member to form an exposed end;

(e) a spring within said socket urging said ratchet members into mutual engagement;

(f) and means connecting said exposed end with said brake operating mechanism, to effect oscillation of said first ratchet and worm shaft thereby to advance said worm gear.

2. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, and a worm for advancing the worm gear, of an automatic slack adjuster for turning said worm, comprising:

(a) a shaft connected to said worm for effecting rotation thereof and including an exposed end having a socket therein;

(b) a first annular ratchet member slidably keyed to the walls of said socket and having ratchet teeth at its inner side;

(c) means for retaining said first ratchet in said socket;

(d) a second annular ratchet member rotatably and slidably mounted in said socket and having teeth for cooperation with the teeth of the first ratchet member;

(e) a stem extending through said ratchet members and including an inner end secured to said second ratchet member and an outer exposed end;

(f) a spring within said socket urging said ratchet members into mutual engagement;

(g) and means connecting said exposed end with said brake operating mechanism, to effect oscillation of said first ratchet and worm shaft thereby to advance said worm gear.

3. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, and a worm for advancing the worm gear, of an automatic slack adjuster for turning said worm, comprising:

(a) a shaft extending through and secured to said worm for turning said worm, said shaft having a cylindrical socket in one end;

(b) a first ratchet member secured to said shaft adjacent the outer end of said socket with its ratchet teeth facing inwardly with respect to said socket;

(c) a second ratchet member slidably and rotatably mounted in said socket and having teeth engageable with the teeth of the first ratchet member;

(d) a stem secured to said second ratchet member in coaxial relation to said shaft and extending through said first ratchet member to form an exposed end;

(e) a spring within said socket urging said ratchet members into mutual engagement;

(f) a pivot pin for joining said oscillatable lever and reciprocable rod, said pivot pin including a head having a transverse screwthreaded hole;

(g) an adjustable lever screwthreaded in said hole;

(h) an extensible link member pivotally connected to an extremity of said lever;

(i) a lever shaft rotatably mounted in the exposed end of said stem;

(j) and pivot means connecting said lever shaft and extensible link member to effect oscillation of said first ratchet and said worm shaft thereby to advance said worm gear.

References Cited by the Examiner

UNITED STATES PATENTS 2,920,724   1/1960   Margetic et al. _____ 188—196

DUANE A. REGER, *Primary Examiner.*